United States Patent
Rousselot (10) Patent No.: US 11,327,144 B2
(45) Date of Patent: May 10, 2022

(54) METHOD, DEVICE AND COMPUTER PROGRAM PRODUCT FOR THE GEOPOSITIONING OF A RADIO TRANSMITTER

(71) Applicant: KERLINK, Thorigné-Fouillard (FR)

(72) Inventor: Florent Rousselot, Thorigné-Fouillard (FR)

(73) Assignee: Kerlink, Thorigne-Fouillard (FR)

( * ) Notice: Subject to any disclaimer, the term of this patent is extended or adjusted under 35 U.S.C. 154(b) by 270 days.

(21) Appl. No.: 16/604,519

(22) PCT Filed: Apr. 10, 2018

(86) PCT No.: PCT/FR2018/050900
§ 371 (c)(1),
(2) Date: Oct. 10, 2019

(87) PCT Pub. No.: WO2018/189477
PCT Pub. Date: Oct. 18, 2018

(65) Prior Publication Data
US 2020/0124693 A1  Apr. 23, 2020

(30) Foreign Application Priority Data

Apr. 11, 2017 (FR) ...................................... 1753177

(51) Int. Cl.
*G01S 5/02* (2010.01)
*G01S 5/06* (2006.01)

(52) U.S. Cl.
CPC .......... *G01S 5/0221* (2013.01); *G01S 5/0278* (2013.01); *G01S 5/06* (2013.01)

(58) Field of Classification Search
None
See application file for complete search history.

(56) References Cited

U.S. PATENT DOCUMENTS

| | | |
|---|---|---|
| 5,058,200 A | 10/1991 | Huang |
| 2003/0146871 A1 | 9/2003 | Karr |
| 2010/0138134 A1 | 6/2010 | Fernandez |
| 2010/0138184 A1 | 6/2010 | Fernandez et al. |
| 2012/0313820 A1* | 12/2012 | Tyree .................... G01S 5/0252 342/450 |
| 2018/0004178 A1* | 1/2018 | Haines ..................... F24F 11/65 |

FOREIGN PATENT DOCUMENTS

WO    WO 2015/028474 A1    3/2015

OTHER PUBLICATIONS

Indian Examination Report dated Feb. 11, 2002.

\* cited by examiner

*Primary Examiner* — Whitney Moore
(74) *Attorney, Agent, or Firm* — Blank Rome LLP (57) ABSTRACT

The invention relates to a method for geolocating a signal-transmitting device, the geolocation method comprising:
a. supplying positions of a plurality of stations and dates of reception of the radio signal by said stations,
b. selecting a reference station,
c. defining a scanning zone,
d. subdividing the scanning zone as a function of a scanning granularity,
e. for each subzone, calculating a degree of cumulative error of said subzone,
f. selecting a subzone exhibiting a minimal degree of cumulative error,
g. defining a new scanning zone,
h. defining a new scanning granularity,
i. iterating the method from the step d).

20 Claims, 3 Drawing Sheets

FIG. 5

METHOD, DEVICE AND COMPUTER PROGRAM PRODUCT FOR THE GEOPOSITIONING OF A RADIO TRANSMITTER

RELATED APPLICATIONS

This application is a U.S. National Stage Application of International Application No. PCT/FR2018/050900, filed on Apr. 10, 2018, which claims priority of French Application No. 1753177, filed on Apr. 11, 2017. The entire contents of those applications are incorporated herein by reference.

TECHNICAL FIELD

The invention relates to the field of the methods for geolocating a radio signal-transmitting device, in particular signal-transmitting devices belonging to the field of the Internet of things. More particularly, the invention relates to the geolocation of a signal-transmitting device in the context of an extended wide-area network comprising a plurality of data concentration gateways.

TECHNOLOGICAL BACKGROUND

The Internet of things consists in allowing things to automatically communicate data with a wireless network. For example, a water meter equipped with a communication module can automatically communicate a water reading to the company managing the billing for the water consumption.

Message concentration gateways, also called stations, have the role of ensuring the reception and the transmission of data from and to the communication modules present in their coverage zone and relaying these data to equipment responsible for processing them, for example servers that can be accessed over a network based on the IP ("Internet Protocol") protocol.

Several radio access technologies are available for the implementation of networks of communication modules. Purely illustrative and nonlimiting examples that can be cited are the LoRa™, Sigfox™ or even WM-Bus ("Wireless Meter Bus") technologies, which rely in particular on different types of modulation. One thing that these technologies have in common is that they offer long-range communications which make it possible to reduce the number of gateways by increasing the coverage thereof.

In some situations, it may be necessary to geolocate certain things transmitting radio signals. That can for example be the case for transmitters associated with mobile things such as product transportation pallets or the like. For that, it is known practice to use satellite guidance (GPS). However, the use of components allowing location via GPS data can be complex, costly and energy intensive for the signal-transmitting device and is not therefore suited to all the uses or to all signal-transmitting devices.

Also known, for example from the document US2010/0138184 A1, is a method for geolocation by triangulation using reception data from a signal transmitted by a signal-transmitting device over a plurality of radio receivers. Such reception data are for example the date of reception of the signal or even the strength of the radio signal received by the different receivers. However, such a triangulation method exhibits limited accuracy and does not make it possible to geolocate the signal-transmitting device with satisfactory reliability.

There is therefore a need for a method for geolocating a radio signal-transmitting device that offers low complexity, reduced consumption and good reliability.

SUMMARY

The invention makes it possible to meet these needs. One idea on which the invention is based is to allow the geolocation of a radio signal-transmitting device without increasing the energy consumption of said radio signal-transmitting device. One idea on which the invention is based is to allow the geolocation of a radio signal-transmitting device without increasing the complexity of said radio signal-transmitting device. One idea on which the invention is based is to allow a geolocation of a radio signal-transmitting device with a satisfactory degree of accuracy. One idea on which the invention is based is to geolocate a radio signal-transmitting device using an infrastructure of a communication network communicating with said radio signal-transmitting device. One idea on which the invention is based is to allow a geolocation of a radio signal-transmitting device with satisfactory reliability.

For that, the invention provides a method for geolocating a signal-transmitting device, said signal-transmitting device transmitting a radio signal, the geolocation method comprising:
a. supplying positions of a plurality of reception stations of a radio communication network and dates of reception of the radio signal by said reception stations,
b. selecting a reference station from among the plurality of reception stations,
c. defining a scanning zone as a function of said positions of the reception stations,
d. subdividing the scanning zone into a plurality of subzones as a function of a scanning granularity,
e. for each subzone, calculating a degree of cumulative error of said subzone, the calculation of the degree of cumulative error of said subzone comprising:
   determining a tested position included in said subzone,
   calculating, for each reception station, a respective transmission error parameter as a function of a date of reception of the radio signal by said reception station, of a date of reception of the radio signal by the reference station, of a speed of propagation of the radio signal, of a distance between the tested position and said reception station and of a distance between the tested position and the reference station,
   calculating the degree of cumulative error of the subzone as a function of the transmission error parameters calculated for all of the reception stations,
f. selecting a subzone exhibiting a minimal degree of cumulative error as subzone of location of the signal-transmitting device,
g. defining a new scanning zone, the new scanning zone including and being centered on the location subzone selected in the step f),
h. defining a new scanning granularity lower than the scanning granularity,
i. iterating the method from the step d) with the new scanning zone as scanning zone and the new granularity as granularity.

By virtue of such a method, it is possible to obtain a geolocation of the radio signal-transmitting device without requiring modification of the signal-transmitting device. In particular, the method according to the invention makes it possible to geolocate a radio signal-transmitting device without increasing the complexity or the energy consumption thereof. Furthermore, the method according to the invention makes it possible, by virtue of the successive iterations, to geolocate the signal-transmitting device with a good geolocation accuracy.

According to other advantageous embodiments, such a geolocation method can have one or more of the following features.

According to one embodiment, on each iteration, the new scanning zone is defined in the step h) as equal to the location subzone selected in the step f) augmented by a margin completely surrounding the location subzone and whose width is greater than the scanning granularity. By virtue of these features, the geolocation method offers a satisfactory geolocation reliability.

According to one embodiment, defining the scanning zone comprises determining a maximum longitude of the reception stations, a minimum longitude of the reception stations, a maximum latitude of the reception stations, a minimum latitude of the reception stations, the scanning zone being delimited by said maximum and minimum longitudes and latitudes. According to one embodiment, defining the scanning zone also comprises adding a margin to the scanning zone delimited by the maximum and minimum longitudes and latitudes of the reception stations.

According to one embodiment, the method comprises a number of iterations greater than 3, for example equal to 7. By virtue of these features, it is possible to obtain a geolocation with satisfactory degree of accuracy.

According to one embodiment, the step of calculation of the transmission error parameter of a reception station corresponds to the formula:

$$E_i^{k,l} = |d_i^{k,l} - d_0^{k,l}| - |((T_i - T_0)*C)|$$

in which $E_i^{k,l}$ is the error parameter of the reception station at the tested position, $d_i^{k,l}$ is the distance between the tested position and the reception station, $d_0^{k,l}$ is the distance between the tested position and the reference station, $T_i$ is the date of reception of the radio signal by the reception station, $T_0$ is the date of reception of the radio signal by the reference station, and C is the speed of propagation of the radio signal transmitted by the signal-transmitting device.

According to one embodiment, the degree of cumulative error of a subzone is the sum of the transmission error parameters of the plurality of reception stations for said subzone.

According to one embodiment, the method further comprises determining a signal quality threshold and not taking into account the radio signal received by the reception station for which the quality of reception of the radio signal is below the determined signal quality threshold. By virtue of these features, the reliability of the geolocation method is satisfactory. In particular, it is thus possible to discard stations for which the quality of reception of the signal is too low to ensure a good reliability of the results.

According to one embodiment, the method further comprises determining a threshold reception date and not taking into account the radio signal received by the stations exhibiting a date of reception of the signal greater than the threshold reception date. By virtue of these features, the reliability of the geolocation is satisfactory. In particular, it is thus possible to discard stations for which the reception of the signal could correspond to a multiple-path signal reception.

According to one embodiment, the method further comprises determining that a distance between two reception stations is less than a threshold difference and performing the step of definition of the scanning zone by using a common position for said two reception stations exhibiting a distance less than the threshold difference.

According to one embodiment, in the step of definition of the scanning zone as a function of the positions of the reception stations, the position of one of said two reception stations for which the distance is less than the threshold difference is not taken into account. In other words, the common position used for the two reception stations exhibiting a distance less than the threshold difference is the position of one of said two stations.

According to one embodiment, the method further comprises determining a median position between said two reception stations for which the distance is less than the threshold difference and performing the step of definition of the scanning zone as a function of the median position calculated in place and without taking into account the positions of said two stations having made it possible to calculate this median position. In other words, the step of definition of the scanning zone is performed as a function of the positions of the reception stations other than said two reception stations and as a function of the median position between said two reception stations for which the distance is less than the threshold difference.

According to one embodiment, the radio signal transmitted by the signal-transmitting device comprises a payload and a header, said header comprising an identifier and a date of transmission of said signal, the method further comprising identifying the radio signal by each reception station using the identifier contained in the header of the signal.

According to one embodiment, the plurality of reception stations are connected to a server, the method further comprising, for each reception station, transmitting to the server a message comprising an identifier of the radio signal, an indication of quality of reception of the radio signal by the reception station, a date of reception of the radio signal, and an identifier of the reception station.

According to one embodiment, the method also provides a device for geolocating a radio signal-transmitting device, said signal-transmitting device transmitting a radio signal, the geolocation device comprising:
 a. a selection module for selecting a reference station from among the plurality of reception stations having received the radio signal,
 b. a module for defining a scanning zone configured to define a scanning zone as a function of the positions of said reception stations,
 c. a subdivision module configured to subdivide the scanning zone into a plurality of subzones as a function of a scanning granularity,
 d. a module for calculating a degree of cumulative error configured to, for each subzone, calculate a degree of cumulative error of said subzone, the calculation of the degree of cumulative error of said subzone comprising:
  determining a tested position included in said subzone,
  calculating, for each reception station, a respective transmission error parameter as a function of a date of reception of the radio signal by said reception station, of a date of reception of the radio signal by the reference station, of a speed of propagation of the radio signal, of a distance between the tested position and said reception station and of a distance between the tested position and the reference station,
  calculating the degree of cumulative error of the subzone as a function of the transmission error parameters calculated for all of the reception stations, e. a subzone selection module configured to select a subzone exhibiting a minimal degree of cumulative error as subzone of location of the signal-transmitting device, in which the module for defining the scanning zone is also configured to define a new scanning zone, the new scanning zone including and being centered on the location subzone selected by the subzone selection module, the subdivision module being also configured to define a new scanning granularity lower than the scanning granularity, the geolocation device being configured to iteratively geolocate the signal-transmitting device from the scanning zones and the granularity defined iteratively by the module for defining the scanning zone and the subdivision module.

According to one embodiment, the invention also provides a computer program comprising instructions on a storage medium capable of being executed by a computer to perform the method as above.

BRIEF DESCRIPTION OF THE FIGURES

The invention will be better understood, and other aims, details, features and advantages thereof will become more clearly apparent, during the following description of several particular embodiments of the invention, given purely by way of illustration and in a nonlimiting manner, with reference to the attached drawings.

DETAILED DESCRIPTION OF EMBODIMENTS

Figure 1:
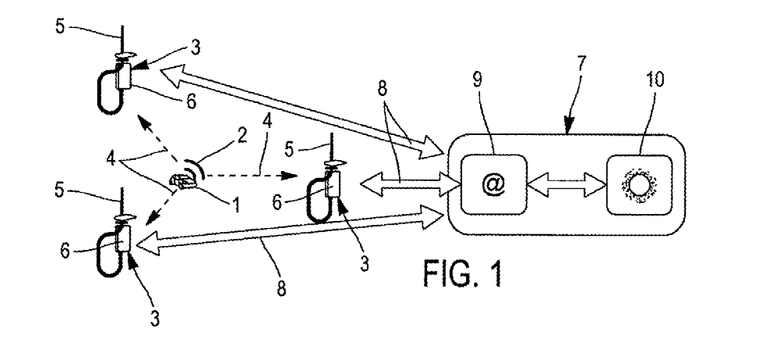
FIG. 1 is a schematic representation of a radio signal-transmitting thing in a wide area communication network comprising a plurality of communication gateways connected to a server.

FIG. 1 illustrates a radio signal-transmitting device 1 to be geolocated. Such a device 1 is of any type capable of communicating data via a radio signal 2, such as, for example, a device 1 belonging to the Internet of things. This device 1 can for example be a wireless sensor, such as a water, gas or other meter. Such a device is equipped with a wireless communication module and can thus communicate data that is measured or calculated, depending on its characteristics, such as, for example, a water, gas or other meter reading. Such a device 1 belonging to the Internet of things has the particular feature of consuming little energy, being commonly qualified as "low consumption", and of using communication means of very low bit rate, for example less than 2 Kbps.

The radio signal 2 transmitted by the device 1 comprises a header and a payload. The header comprises technical information allowing for the processing of the radio signal 2. This technical information is for example information on the device 1 having transmitted the radio signal 2, the recipient of the radio signal 2 or even an identifier of the radio signal 2. The payload of the radio signal 2, for its part, comprises the data transmitted by the device 1 and intended for processing by the recipient of the radio signal 2 such as, for example, the data read by the sensor, monitoring information on the status of the device 1 or other information requested by the recipient of the radio signal 2.

When the radio signal 2 is transmitted by the device 1, this radio signal 2 is received by a plurality of stations 3, or message concentration gateways, situated near the device 1, as illustrated by the arrows 4 in FIG. 1.

In FIG. 1, three stations 3 are illustrated. Each station 3 comprises at least one antenna 5. This antenna 5 makes it possible to pick up the radio signals 2 transmitted within a given radius around said station 3. The station 3 also comprises a control box 6 making it possible to process the radio signal 2 received. The processing of the radio signal 2 by the control box 6 consists at least in transmitting the information contained in the radio signal 2 to a remote server 7. For that, the control box 6 comprises a communication interface connected to a network, such as a wide area communication network of Internet or other type.

The control box 6 sends, via this communication network, a message 8 to the remote server 7. This message 8 contains the information contained in the radio signal 2 received with which additional information is associated. This additional information is for example an indication of quality of reception of the radio signal 2 received, a date of arrival of the radio signal 2 at the station 3 or even an identifier of the station 3. Thus, in the example illustrated in FIG. 1, the radio signal 2 transmitted by the device 1 is received by three stations 3 and each station 3 sends to the remote server 7 a respective message 8 comprising the content of the radio signal 2 associated with the indicators of quality of reception of the radio signal 2, on identification of the station 3 and on date of reception of the radio signal 2 by said station 3. The quality of the signal received by the station 3 is for example expressed by the acronym RSSI ("Received Signal Strength Indication") and/or the signal-to-noise ratio, hereinafter referred to by its acronym SNR, of the radio signal 2.

The remote server 7 comprises a flow aggregator 9 and a location application 10 (for example of the LBS type, LBS standing for "Location-Based Service"). The flow aggregator 9 makes it possible to receive all the messages 8 transmitted by the stations 3. This flow aggregator 9 is configured to decode the header of the radio signal 2 in order to extract from it the identification number of the radio signal 2. The flow aggregator 9 transmits, to the location application 10, for each message 8 received by the flow aggregator 9, the identifier of the radio signal 2, the date of reception of the radio signal 2 by the station 3, the identifier of the station 3 and the indication of quality of reception of the radio signal 2 by the station 3. The location application 10 geolocates the device 1 having transmitted the radio signal 2 from these data as explained hereinbelow with respect to FIGS. 2 to 5.

When the location application 10 receives, for one and the same radio signal 2, a plurality of data from at least three distinct stations 3 having received said radio signal 2, the location application 10 can geolocate by triangulation the device 1 having transmitted said radio signal 2. This identification of reception of one and the same radio signal 2 by distinct stations 3 is performed using the radio signal 2 identifier decoded from the header of said radio signal 2, in other words, when at least three messages 8 comprise the same radio signal 2 identifier, the location application 10 can perform a geolocation of the device 1 by means of the geolocation method illustrated in FIG. 4.

Figure 4:
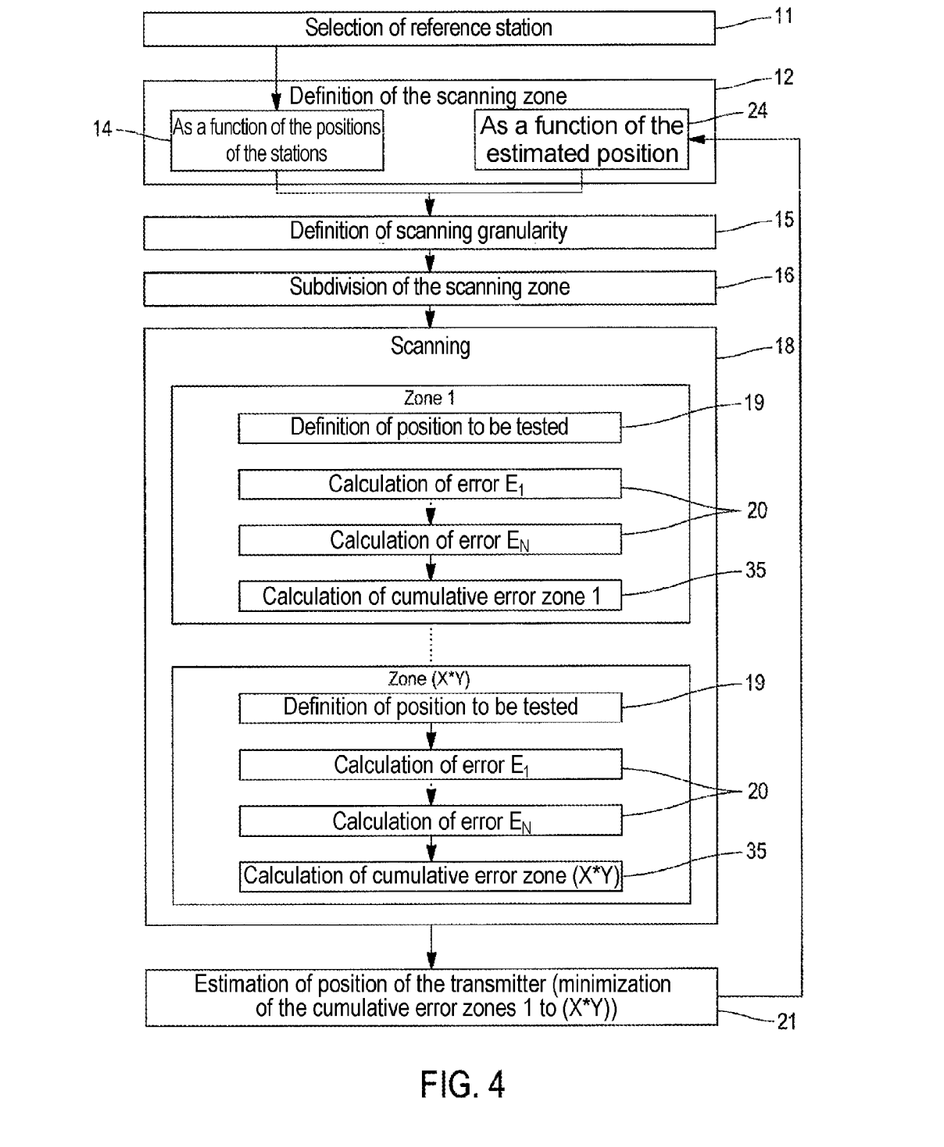
FIG. 4 is a diagram illustrating the successive steps of a geolocation method according to a first embodiment.

In a first step 11 of the geolocation method illustrated in FIG. 4, the geolocation application 10 selects a reference station from among the stations 3 having received the radio signal 2. This reference station is determined arbitrarily. Thus, in one embodiment, the reference station is the station 3 having the lowest date of reception of the radio signal 2, that is to say the station 3 having received the radio signal 2 the earliest.

In a second step 12, the geolocation application 10 determines a scanning zone 13 to locate the device 1.

Figure 2:
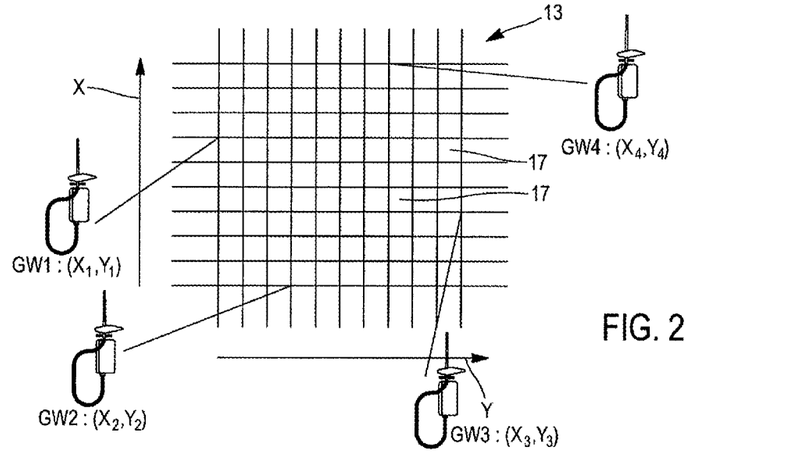
FIG. 2 is a schematic representation of a geographic scanning zone subdivided into subzones and in which a plurality of reception stations are located.

In a first iteration of the geolocation method, the step 12 of definition of the scanning zone 13 comprises a step 14 of definition of the scanning zone 13 as a function of the coordinates of the stations 3 having received the radio signal 2. FIG. 2 illustrates an exemplary embodiment of the step 14 of definition of the scanning zone 13 in the first iteration of the geolocation method and in the context of a radio signal 2 having been received by four distinct stations 3 referenced GWi, i ranging from 1 to 4 in FIG. 2. Each station GWi is located and has coordinates (Xi, Yi) corresponding respectively to its latitude and to its longitude. In order to define the scanning zone 13 in this step 14 of the first iteration of the geolocation method, the geolocation application 10 determines the maximum and minimum latitudes of the stations GWi and the maximum and minimum longitudes of said stations GWi having received the radio signal 2. Thus, in the example illustrated in FIG. 2, the geolocation method 10 determines that the minimum latitude of the stations is the latitude of value X2 of the station GW2 and the maximum latitude is the latitude X4 of the station GW4. Likewise, the minimum longitude is the longitude Y1 of the station GW1 and the maximum longitude is the longitude Y3 of the station GW3. The scanning zone 13 defined in this step 14 is delimited by the duly determined maximum and minimum coordinates. Thus, the scanning zone 13 defined in this step 14 in the example illustrated in FIG. 2 is defined as the zone contained between the latitudes X2 and X4 and the longitudes contained between Y1 and Y3. The scanning zone 13 thus defined represents a geographic zone comprising each of the stations GWi having received the radio signal 2. This scanning zone 13 defined using the coordinates of the stations GWi can possibly be augmented by a margin surrounding said scanning zone 13, such a margin making it possible to obtain a better geolocation reliability.

When the scanning zone 13 is defined, the geolocation application 10 determines, in a step 15, a scanning granularity. In the first iteration of the geolocation method, this scanning granularity is defined arbitrarily, for example with a value of 1° of latitude/longitude. The scanning zone 13 is then, in a step 16 of the geolocation method, subdivided into square subzones 17 based on the scanning granularity, that is to say square subzones 17 of 1° sides between the coordinates (X1, Y2) and (X4, Y3) in the example illustration in FIG. 2.

The location application 10 scans the scanning zone 13 in a scanning step 18 in order to determine the subzone 17 comprising the device 1 transmitting the radio signal 2. For that, for each subzone 17, the geolocation application 10 defines, in a step 19, a position to be tested for the corresponding subzone. This position to be tested has coordinates (k,l) contained in said subzone 17. This position to be tested is for example centered in the subzone 17. The rule for definition of the position to be tested for each subzone 17 is applied uniformly for all the subzones 17 of the scanning zone 13.

For each subzone 17, the geolocation application 10 calculates a cumulative error parameter associated with said subzone 17. For that, the geolocation application 10 calculates, in a step 20, for each station 3, an error parameter $E_i^{k,l}$.

For that, for each station, the geolocation application 10 applies the following formula:

$$E_i^{k,l} = |d_i^{k,l} - d_0^{k,l}| - |((T_i - T_0)*C)|$$

in which:

$E_i^{k,l}$ is the error parameter of the station i for a tested position of coordinates k,l;

$d_i^{k,l}$ is the distance between the station i and the tested position of coordinates k,l. This distance is calculated using location information of the station i transmitted by the station i in the message 8 to the server 7;

$d_0^{k,l}$ is the distance between the reference station and the tested position of coordinates k,l. This distance is calculated using location information of the reference station transmitted in the message 8 transmitted by said reference station to the server 7;

Ti is the date of reception of the radio signal 2 by the station i;

T0 is the date of reception of the radio signal 2 by the reference station;

C is the speed of propagation of the radio signal 2.

This calculation of the error parameter 20 is performed for the tested position (k,l) of each subzone 17 for all of the stations 3 having received the radio signal 2.

When all of the error parameters $E_i^{k,l}$ of a subzone 17 have been calculated for all the stations i having received the radio signal 2, said subzone 17 comprising the tested position is associated with a cumulative error parameter corresponding to the sum of the error parameters $E_i^{k,l}$ thus calculated for this subzone 17. In other words, the geolocation application 10 calculates, in a step 35 for each subzone 17, a cumulative error parameter according to the following formula:

$$\sum_{i=2}^{N} E_i^{k,l}$$

in which i is the station tested, N is the number of stations having received the radio signal 2 and $E_i^{k,l}$ is the error parameter calculated by the station i for the coordinates (k,l) corresponding to the position to be tested in the corresponding subzone 17.

When all of the cumulative error parameters are calculated for all of the subzones 17, the geolocation application 10 selects, in a step 21, the subzone 17 exhibiting the lowest cumulative error parameter. This selected subzone is the subzone 17 in which the device 1 transmitting the radio signal 2 is situated.

Figure 3:
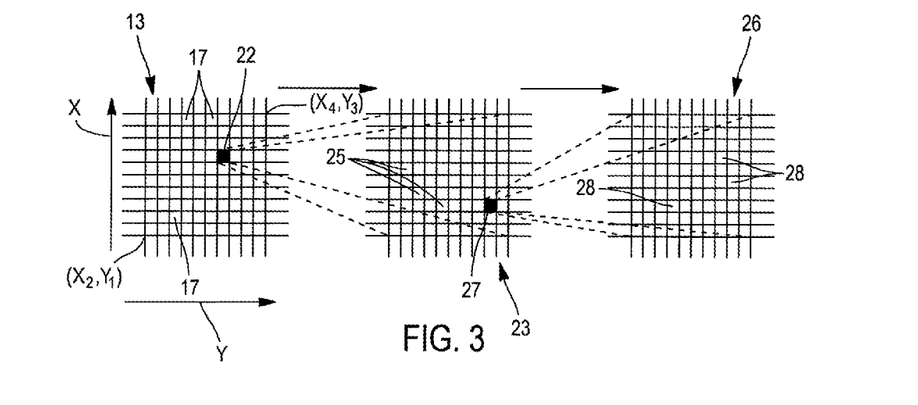
FIG. 3 is a schematic representation of geographic scanning zones selected upon successive iterations of the geolocation method of FIG. 4.

However, this location is performed with a degree of accuracy corresponding to the scanning granularity defined in the step 15. It is therefore preferable to perform new iterations of the geolocation method on the one hand by reducing the scanning zone 13 but also by reducing the scanning granularity as is illustrated in FIG. 3. Thus, for each iteration, it is necessary to redefine the scanning zone, the scanning granularity in order to subdivide the redefined scanning zone, to calculate the cumulative error for all the subzones of the new scanning zone and to select as subzone the subzone exhibiting the smallest cumulative error parameter.

In FIG. 3, the scanning zone 13 on the left in FIG. 3 illustrates the scanning zone 13 corresponding to the scanning zone 13 illustrated in FIG. 2 and defined in a first iteration of the geolocation method defined in FIG. 4. In this first iteration, the lowest cumulative error parameter has been identified in the subzone referenced 22 in FIG. 3, this subzone 22 having coordinates contained between (X2+6°, Y1+6°) and (X2+7°, Y1+7°). In order to improve the accuracy of the geolocation of the device 1, at least one second iteration of the geolocation method is necessary. A first step of this second iteration is to define a new scanning zone 23 in a step 24 of the method illustrated in FIG. 4. This new scanning zone 23 is defined as being the subzone 22 selected in the first iteration in the step 21. Thus, in the example illustrated in FIG. 3, this new scanning zone 23 is contained between the latitudes X2+6° and X2+7° and the longitudes Y1+6° and Y1+7°.

When the geolocation application 10 has defined this new scanning zone 23, the geolocation application 10 reiterates the step 15 in order to define a new granularity for the scanning of the new scanning zone 23. This new scanning granularity is for example a fraction of the scanning granularity defined in the step 15 of the preceding iteration, that is to say the first iteration. In the example illustrated in FIGS. 2 and 3, the scanning granularity defined for the scanning zone 13 in the first iteration was 1°. In the second iteration, the scanning granularity is defined as a fraction of the scanning granularity of the first iteration, for example a scanning granularity of 0.1°.

The geolocation application 10 reiterates the subdivision step 16 by applying it to the new scanning zone 23. Thus, the new scanning zone 23 is subdivided into a plurality of square subzones 25 of 0.1° side. The geolocation application 10 performs the scanning step 18 on all of the subzones 25 in order to calculate the cumulative error parameter for each of these subzones 25. Thus, for each subzone 25, the geolocation application defines a new position to be tested, an error parameter at the tested position is calculated for each station 3 and a cumulative error parameter is associated with each subzone 25. The geolocation application 10 then selects the subzone 25 exhibiting the lowest cumulative error parameter as being the subzone 25 in which the device 1 is situated.

The geolocation application 10 can execute a plurality of iterations in order to improve the geolocation accuracy. Thus, like the second iteration, a third iteration defines a new scanning zone 26 as being the subzone 25 selected in the step 21 of the preceding iteration, that is to say in the second iteration. Thus, in FIG. 3, the second iteration culminates in the selection of a subzone 27 out of the subzones 25 as exhibiting the lowest cumulative error parameter. This subzone 27 is the zone included between the latitudes X2+6.2° and X2+6.3° and the longitudes Y1+6.8° Y1+6.9°. The new scanning zone 26 is defined in this third iteration as the duly selected subzone 27. In this third iteration, a new scanning granularity is defined in the step 15 as a fraction of the scanning granularity of the second iteration, for example a scanning granularity of 0.01°. The application then subdivides the new scanning zone 26 according to this new scanning granularity and then determines the cumulative error parameters of the subzones 28 of this new scanning zone 26 before selecting said subzone 28 exhibiting the lowest cumulative error parameter.

The geolocation application 10 iteratively performs the calculation of the cumulative error parameters for subzones of successive reduced scanning zones with scanning granularities reduced on each new iteration. Preferably, the geolocation application 10 performs at least three iterations of the cumulative error calculation and, preferentially, performs seven successive iterations of this cumulative error calculation. On the last iteration, the selected subzone represents the subzone in which the device 1 transmitting the radio signal 2 is geolocated.

In order to avoid any errors in geolocation of the device 1, it is preferable in successive definitions of the scanning zones of the step 24 to add a margin to the subzone selected in the step 21 of the preceding iteration. Indeed, the presence of obstacles between the device 1 transmitting the radio signal 2 and the stations 3 receiving said radio signal 2 can increase the date of reception of the radio signal 2 by said stations 3 and therefore modify the error parameter associated with said station 3 in the step 20. Consequently, the minimum cumulative error parameter of a scanning zone can be erroneous so that the selected subzone can be a subzone not including the device 1.

It is therefore preferable to define the new scanning zone in the step 24 as including the subzone selected in the preceding iteration in the step 21 and to add an error margin thereto. Such a margin extends over a predefined thickness all around the subzone selected in the step 21 of the preceding iteration. This thickness is for example defined as a function of the granularity used in the scanning of the preceding iteration. In an exemplary embodiment, the error margin has a thickness around the selected subzone equal to the scanning granularity of the preceding iteration multiplied by a positive integer, for example 5.

In the example indicated above with respect to FIG. 3, the definition of the new scanning zone 23 in the step 24 of the second iteration is performed by adding to the first selected subzone 22 a margin equal to five times the granularity of 1° defined in the first iteration. Thus, the new scanning zone 23 is therefore included between the latitudes X2+(6−5*1)° and X2+(7+5*1)° and the longitudes Y1+(6−5)° Y1+(7+5)°, in other words included between the latitudes X2+1° and X2+12° and the longitudes Y1+1° Y1+12°, with a scanning granularity of 0.1°. Likewise, the scanning zone 26 defined in the step 24 of the third iteration includes the subzone 27 selected in the step 21 of the second iteration, to which is added a margin of five times the scanning granularity of 0.1° defined in the second iteration. This scanning zone 26 defined in the third iteration is therefore included between the latitudes X2+(6.2−0.1*5)° and X2+(6.3+0.1*5)° and the longitudes Y1+(6.8−0.1*5)° Y1+(6.9+0.1*5)°, i.e. between the latitudes X2+5.7° and X2+6.8° and the longitudes Y1+6.3° Y1+7.4°, with a scanning granularity of 0.01°.

Other functionalities of the server 7 also make it possible to improve the quality of geolocation of the device 1. Thus, as illustrated in FIG. 5, the geolocation application 10 can comprise a pre-processing and a post-processing to the geolocation method as described above with respect to FIG. 4.

Figure 5:
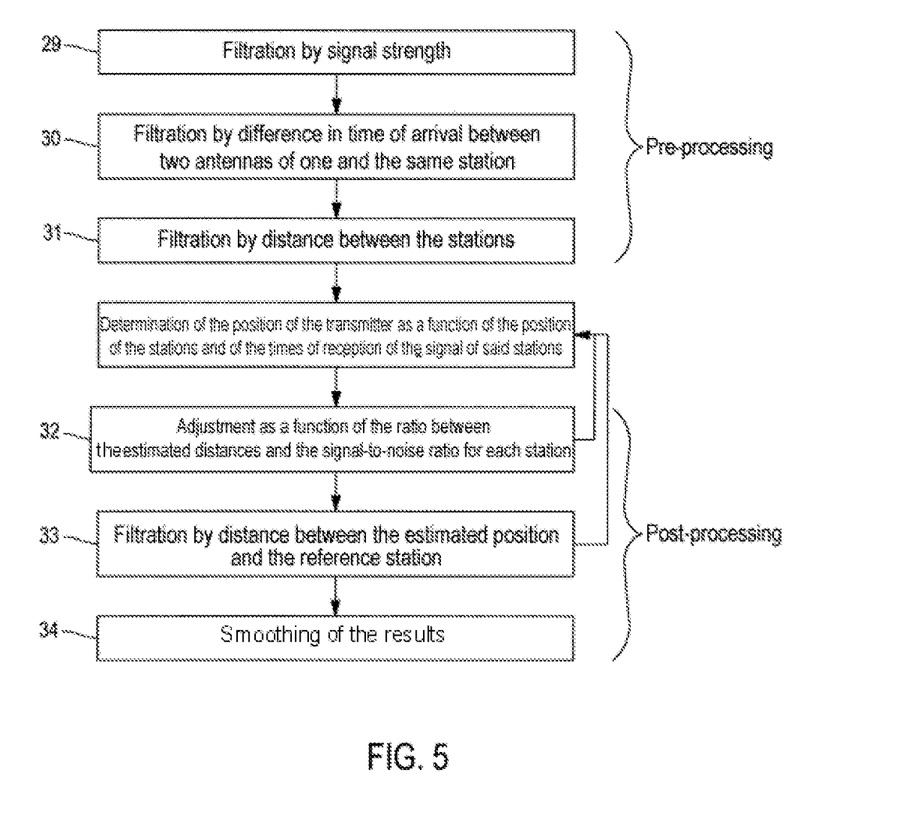
FIG. 5 is a diagram illustrating the successive steps of a geolocation method according to a second embodiment.

A first preprocessing illustrated in the step 29 of FIG. 5 can consist in discarding the stations 3 having received the radio signal 2 with a signal quality that is too low to be able to be used with a satisfactory degree of reliability. Thus, when the message 8 transmitted to the server 7 by the station 3 exhibits a signal quality associated with the data corresponding to said radio signal 2 lower than a threshold value, this station 3 is not taken into account by the geolocation application 10. Such a threshold value is determined arbitrarily. In one example, in the case of a signal quality expressed using RSSI, this threshold value is of the order of −130 dB. Thus, a message 8 from a station 3 having received the radio signal 2 with an RSSI lower than −130 dB is not taken into account by the geolocation application 10 for the geolocation of the device 1.

A second pre-processing illustrated by the step 30 of FIG. 5 consists in discarding the stations 3 having multiple reception antennas 5 having received the radio signal 2 and for which the difference in date of reception of the radio signal 2 at the different antennas 5 of said station 3 is above a threshold difference, for example a threshold difference of the order of 1500 ns. The message 8 corresponding to the highest date of reception, that is to say the message corresponding to the longest path and therefore received last, is then discarded by the geolocation application 10 for the geolocation of the device 1.

In a third pre-processing illustrated by the step 31 in FIG. 5, a filtration according to the distances between the different stations 3 having received the radio signal 2 is performed. The function of this filtration is to ensure that the stations 3 having received the message 8 are sufficiently far apart from one another to ensure a good feasibility of the geolocation. Typically, if two stations 3 are ten or so meters apart, the step 14 of definition of the scanning zone 13 according to the coordinates of the stations 3 having received the message in the first iteration of the geolocation method is refined. For that, said step 14 of definition of the scanning zone 13 comprises a step (not illustrated) of comparison of the distances between the stations 3 with a threshold distance, for example 500 meters.

According to a first variant, when the distance between two of the stations 3 having received the message is less than this threshold distance, only the geographic position of one of said two stations 3 is taken into account to define the scanning zone 13 in the step 14 in the first iteration of the geolocation method. The station 3 which is not taken into account in this step 14 of definition of the scanning zone 13 is chosen arbitrarily, for example as being the one which has received the message last. However, this station 3 is discarded only for the step 14 of definition of the scanning zone 13, the steps of scanning 18 and of cumulative error calculation 35, for their part, remain to be performed by incorporating the steps 20 of calculations of error of said two stations 3, including the station 3 discarded for the step 14 of definition of the scanning zone 13.

In a second variant, when the distance between two of the stations 3 having received the message is less than this threshold distance, a median position between said two stations 3 is calculated. The step 14 of definition of the scanning zone 13 as a function of the coordinates of the stations 3 having received the message 8 is then performed without taking into account said two stations 3 but by taking into account, instead of said two stations 3, the median position between these two stations 3. Here again, the steps of scanning 18 and of cumulative error calculation 35 are performed by taking into account said two stations 3.

In a first post-processing illustrated in the step 32 of FIG. 5, the geolocation application 10 corrects the estimated distances between the stations 3 having received the radio signal 2 and the estimated position of the device 1. For that, the application calculates, for each station 3, an SNR/dist ratio between the SNR (signal-to-noise ratio) of the radio signal 2 received by a station 3 and the distance calculated between the estimated position of the device 1 by the geolocation application 10 and the position of said station 3. The geolocation application 10 then calculates a mean of the SNR/dist ratios. This first post-processing 32 is based on the principle that the obstacles are distributed uniformly in the zone of transmission of the radio signal 2 and that the SNR/dist ratio should be uniform for all the stations 3 having received the signal.

When an SNR/dist ratio associated with a message 8 is greater than this mean of the SNR/dist ratios, the geolocation application 10 increments the date of reception of the radio signal 2 by the station 3 corresponding to said message 8. When an SNR/dist ratio associated with a message 8 is lower than this mean of the SNR/dist ratios, the geolocation application 10 decrements the date of reception of the radio signal 2 by the station 3 corresponding to said message 8. This incrementation or decrementation is performed for example with a granularity of 10 ns. Furthermore, this modification of the date of reception of the signal can be proportional to the difference between the calculated SNR/dist ratio and the mean of the SNR/dist ratios. Thus, the greater the difference noted between the average of the SNR/dist ratios and the SNR/dist ratio of a message 8, the greater the correction of the date of reception by the station 3 having transmitted said message 8. The geolocation application 10 then performs the geolocation of the device 1 once again (definition of the reference station and successive iterations of the definition of the scanning zone, of the scanning granularity, of the cumulative error parameter calculation and of the selection of the subzone), by using the data on dates of reception of the radio signal 2 thus modified.

A second post-processing step 33 consists in discarding a result of the geolocation application 10 which would be too near or too far away with respect to the reference station, which could correspond to an inconsistent geolocation of the device 1. In other words, once the geolocation of the position of the device 1 is finished, the distance between this estimated position of the device 1 and the reference station is compared to limit maximum and minimum values. These limits values are determined either in absolute fashion, or in relative fashion with respect to the different inter-station 3 distances used. Any estimation too far away from the reference station is rejected as inconsistent. Likewise, any estimation that is too near to the reference station, for example less than a few tens of meters, is also rejected. The geolocation application then performs a new estimation of the geolocation of the device 1 as explained above with respect to FIG. 4 by discarding from the processing the reference station previously selected.

A third post-processing 34 can consist in smoothing the results supplied by the geolocation application 10 over time and attenuating the differences inherent in the measurement uncertainties. Thus, the successive estimations of the position of one and the same device 1 obtained using different radio signals 2 processed by the geolocation application 10 are averaged. The number of estimations used on each average is dependent on the type of device 1, the more mobile the device 1 the lower this number.

The geolocation method according to the invention thus makes it possible to geolocate a signal-transmitting device by exploiting a signal generated by said device without requiring analysis of the payload of this signal. Thus, when the device sends a signal such as a meter reading or the like for the attention of a remote server, the geolocation method according to the invention makes it possible to geolocate the device by using this signal transmission without requiring analysis of the content of the payload of the signal. Thus, the method according to the invention makes it possible to geolocate the device without requiring an ad hoc signal to be sent by the device but by using the normal operating signals of the device. The geolocation method thus makes it possible to geolocate the device without imposing upon it energy consumption or additional complexity compared to its normal operation.

Although the invention has been described in relation to several particular embodiments, it is clearly obvious that it is in no way limited thereto and that it comprises all the technical equivalents of the means described and the combinations thereof if the latter fall within the scope of the invention.

Some of the elements represented, in particular the components of the gateway, can be produced in different forms, in a unitary or distributed manner, by means of hardware and/or software components. Hardware components that can be used are specific integrated circuits ASIC, programmable logic arrays FPGA or microprocessors. Software components, can be written in different programming languages, for example C, C++, Java or VHDL. This list is not exhaustive.

The use of the verb "contain", "comprise" or "include" and the conjugated forms thereof does not preclude the presence of elements or steps other than those stated in a claim.

In the claims, any reference symbol between parentheses should not be interpreted as a limitation on the claim.

The invention claimed is:

1. A method for geolocating a signal-transmitting device, said signal-transmitting device transmitting a radio signal (2), the geolocation method comprising:
   a. supplying positions of a plurality of reception stations (3, GWi) of a radio communication network and dates of reception ($T_i$) of the radio signal (2) by said reception stations (3, GWi),
   b. selecting a reference station (3, GWi) from among the plurality of reception stations (3, GWi),
   c. defining (14) a scanning zone (13) as a function of the positions (Xi, Yi) of said reception stations (3, GWi),
   d. subdividing the scanning zone (13) into a plurality of subzones (17) as a function of a scanning granularity,
   e. for each subzone (17, 25, 28), calculating a degree of cumulative error of said subzone (17, 25, 28), the calculation of the degree of cumulative error of said subzone (17, 25, 28) comprising:
      determining (19) a tested position (k,l) included in said subzone (17, 25, 28),
      calculating, for each reception station (3, GWi) a respective transmission error parameter ($E_i^{k,l}$) as a function of a date of reception ($T_i$) of the radio signal (2) by said reception station (3, GWi), of a date of reception of the radio signal (2) by the reference station ($T_0$), of a speed of propagation (C) of the radio signal (2), of a distance ($d_i^{k,l}$) between the tested position (k,l) and said reception station (3, GWi) and of a distance ($d_i^{k,l}$) between the tested position (k,l) and the reference station,
      calculating the degree of cumulative error of the subzone (17, 25, 28) as a function of the transmission error parameters ($E_i^{k,l}$) calculated for all of the reception stations (3, GWi),
   f. selecting (21) a subzone (22, 27) exhibiting a minimal degree of cumulative error as subzone (22, 27) of location of the signal-transmitting device (1),
   g. defining (24) a new scanning zone (23, 26), the new scanning zone (23, 26) including and being centered on the location subzone (22, 27) selected in the step f),
   h. defining (15) a new scanning granularity lower than the scanning granularity,
   i. iterating the method from the step d) with the new scanning zone (23, 26) as scanning zone (23, 26) and the new granularity as granularity,
   and in which, on each iteration, the new scanning zone (23, 26) is defined in the step h) as equal to the location subzone (22, 27) selected in the step f) augmented by a margin completely surrounding the location subzone (22, 27) and whose width is greater than the scanning granularity.

2. The method as claimed in claim 1, in which defining the scanning zone (14) comprises determining a maximum longitude of the reception stations (3, GWi), a minimum longitude of the reception stations (3, GWi), a maximum latitude of the reception stations (3, GWi), a minimum latitude of the reception stations (3, GWi), the scanning zone (13) being delimited by said maximum and minimum longitudes and latitudes.

3. The method as claimed in claim 2, comprising a number of iterations greater than 3, for example 7.

4. The method as claimed in claim 2, in which the step of calculation of the transmission error parameter (35) of a reception station corresponds to the formula:

$$E_i^{k,l} = |d_i^{kl} - d_0^{kl}| - |((T_i - T_0) * C)|$$

in which $E_i^{k,l}$ the error parameter of the reception station (3, GWi) at the tested position (k,l), $d_i^{k,l}$ is the distance between the tested position (k,l) and the reception station (3, (GWi), $d_0^{k,l}$ is the distance between the tested position (k,l) and the reference station, $T_i$ is the date of reception of the radio signal (2) by the reception station (3, GWi), $T_0$ is the date of reception of the radio signal (2) by the reference station, and C is the speed of propagation of the radio signal (2) transmitted by the signal-transmitting device (1).

5. The method as claimed in claim 2, in which the degree of cumulative error of a subzone (17, 25, 28) is the sum of the transmission error parameters of the plurality of reception stations (3, GWi) for said subzone (17, 25, 28).

6. The method as claimed in claim 2, further comprising determining a signal quality threshold and not taking into account the radio signal received by the reception stations whose radio signal reception quality is lower than the determined signal quality threshold.

7. The method as claimed in claim 1, comprising a number of iterations greater than 3, for example 7.

8. The method as claimed in claim 7, in which the step of calculation of the transmission error parameter (35) of a reception station corresponds to the formula:

$$E_i^{k,l} = |d_i^{kl} - d_0^{kl}| - |((T_i - T_0) * C)|$$

in which $E_i^{k,l}$ is the error parameter of the reception station (3, GWi) at the tested position (k,l), $d_i^{k,l}$ is the distance between the tested position (k,l) and the reception station (3, GWi), $d_0^{k,l}$ is the distance between the tested position (k,l) and the reference station, $T_i$ is the date of reception of the radio signal (2) by the reception station (3, GWi), $T_0$ is the date of reception of the radio signal (2) by the reference station, and C is the speed of propagation of the radio signal (2) transmitted by the signal-transmitting device (1).

9. The method as claimed in claim 7, in which the degree of cumulative error of a subzone (17, 25, 28) is the sum of the transmission error parameters of the plurality of reception stations (3, GWi) for said subzone (17, 25, 28).

10. The method as claimed in claim 7, further comprising determining a threshold date of reception and not taking into account the radio signal received by the stations having a signal reception date greater than the threshold reception date.

11. The method as claimed in claim 1, in which the step of calculation of the transmission error parameter (35) of a reception station corresponds to the formula:

$$E_i^{k,l} = |d_i^{kl} - d_0^{kl}| - |((T_i - T_0) * C)|$$

in which $E_i^{k,l}$ is the error parameter of the reception station (3, GWi) at the tested position (k,l), $d_i^{k,l}$ is the distance between the tested position (k,l) and the reception station (3, GWi), $d_0^{k,l}$ is the distance between the tested position (k,l) and the reference station, $T_i$, is the date of reception of the radio signal (2) by the reception station (3, GWi), $T_0$ is the date of reception of the radio signal (2) by the reference station, and C is the speed of propagation of the radio signal (2) transmitted by the signal-transmitting device (1).

12. The method as claimed in claim 11, in which the degree of cumulative error of a subzone (17, 25, 28) is the sum of the transmission error parameters of the plurality of reception stations (3, GWi) for said subzone (17, 25, 28).

13. The method as claimed in claim 1, in which the degree of cumulative error of a subzone (17, 25, 28) is the sum of the transmission error parameters of the plurality of reception stations (3, GWi) for said subzone (17, 25, 28).

14. The method as claimed in claim 1, further comprising determining a signal quality threshold and not taking into account the radio signal received by the reception stations whose radio signal reception quality is lower than the determined signal quality threshold.

15. The method as claimed in claim 1, further comprising determining a threshold date of reception and not taking into account the radio signal received by the stations having a signal reception date greater than the threshold reception date.

16. The method as claimed in claim 1, further comprising determining that a distance between two reception stations (3, GWi) is less than a threshold difference and performing the step c) of defining the scanning zone (13) by using a common position for said two reception stations (3, GWi) having a distance less than the threshold difference.

17. The method as claimed in claim 1, in which the radio signal (2) transmitted by the signal-transmitting device (1) comprises a payload and a header, said header comprising an identifier and a date of transmission of said radio signal (2), the method further comprising identifying the radio signal by each reception station (3, GWi) using the identifier contained in the header of the signal.

18. The method as claimed in claim 1, in which the plurality of reception stations (3, GWi) are connected to a server (7), the method further comprising, for each reception station (3, GWi), transmitting to the server (7) a message (8) comprising an identifier of the radio signal, an indication of quality of reception of the radio signal (2) by the reception station (3, GWi), a date of reception of the radio signal (2), and an identifier of the reception station (3, GWi).

19. A computer program product comprising program code instructions stored on a non-transitory computer-readable storage medium for implementing the steps of the method as claimed in claim 1 when said program runs on a computer.

20. A device for geolocating a radio signal-transmitting device, said signal-transmitting device transmitting a radio signal, the geolocation device comprising:
  a. a selection module for selecting a reference station (3, GWi) from among the plurality of reception stations (3, GWi) having received the radio signal (2),
  b. a module for defining a scanning zone (13) configured to define a scanning zone (13) as a function of the positions (Xi, Yi) of said reception stations (3, GWi),
  c. a subdivision module configured to subdivide the scanning zone (13) into a plurality of subzones (17) as a function of a scanning granularity,
  d. a module for calculating a degree of cumulative error configured to, for each subzone (17, 25, 28), calculate a degree of cumulative error of said subzone (17, 25, 28), the calculation of the degree of cumulative error of said subzone (17, 25, 28) comprising:
    determining a tested position (k,l) included in said subzone (17, 25, 28),
    calculating, for each reception station (3, GWi), a respective transmission error parameter ($E_i^{k,l}$) as a function of a date of reception ($T_i$) of the radio signal (2) by said reception station (3, GWi), of a date of reception of the radio signal (2) by the reference station ($T_0$), of a speed of propagation (C) of the radio signal (2), of a distance ($d_i^{k,l}$) between the tested position (k,l) and said reception station (3, GWi) and of a distance ($d_0^{k,l}$) between the tested position (k,l) and the reference station,
    calculating the degree of cumulative error of the subzone (17, 25, 28) as a function of the transmission error parameters ($E_i^{k,l}$) calculated for all of the reception stations (3, GWi),
  e. a subzone selection module configured to select a subzone (22, 27) exhibiting a minimum degree of cumulative error as subzone (22, 27) of location of the signal-transmitting device (1),
  in which the module for defining the scanning zone is also configured to define a new scanning zone (23, 26), the new scanning zone (23, 26) including and being centered on the location subzone (22, 27) selected by the subzone selection module, the subdivision being also configured to define a new scanning granularity lower than the scanning granularity, the geolocation device being configured to iteratively geolocate the signal-transmitting device from the scanning zones and the granularity defined iteratively by the scanning zone definition module and the subdivision module, and in which, on each iteration, the new scanning zone (23, 26) is defined as equal to the location subzone (22, 27) selected by the subzone selection module augmented by a margin completely surrounding the location subzone (22, 27) and whose width is greater than the scanning granularity.

* * * * *